United States Patent
Kent et al.

(10) Patent No.: US 7,991,361 B2
(45) Date of Patent: Aug. 2, 2011

(54) METHOD AND SYSTEM FOR SINGLE WEIGHT (SW) ANTENNA SYSTEM FOR SINGLE CHANNEL (SC) MIMO SYSTEM FOR WCDMA

(75) Inventors: Mark Kent, Vista, CA (US); Vinko Erceg, Cardiff, CA (US); Uri Landau, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1360 days.

(21) Appl. No.: 11/173,129

(22) Filed: Jun. 30, 2005

(65) Prior Publication Data

US 2006/0072513 A1    Apr. 6, 2006

Related U.S. Application Data

(60) Provisional application No. 60/616,245, filed on Oct. 6, 2004.

(51) Int. Cl.
*H04B 1/10* (2006.01)
(52) U.S. Cl. ............... 455/67.13; 455/558; 375/299
(58) Field of Classification Search ............... 455/67.13, 455/570, 296, 63.1; 375/265; 370/335
See application file for complete search history.

(56) References Cited

U.S. PATENT DOCUMENTS

| | | | | |
|---|---|---|---|---|
| 2002/0191709 A1* | 12/2002 | Hunton | ...................... | 375/295 |
| 2003/0012299 A1* | 1/2003 | Kuchi et al. | .................. | 375/299 |
| 2004/0179626 A1* | 9/2004 | Ketchum | ...................... | 375/265 |
| 2004/0203458 A1* | 10/2004 | Nigra | .......................... | 455/67.13 |
| 2005/0243898 A1* | 11/2005 | Reznik et al. | ................. | 375/147 |
| 2008/0181152 A1* | 7/2008 | Utsunomiya et al. | ......... | 370/310 |

OTHER PUBLICATIONS

Jan Mietzner and Peter A. Hoeher, University of Kiel, Adaptive Antennas and MIMO Systems for Wireless Communications, *Boosting the Performance of Wireless Communication Systems: Theory and Practice of Multiple-Antenna Techniques*, IEEE Communications Magazine, Oct. 2004, pp. 40-47.

Simon Haykin, McMaster University; Mathini Sellathurai, Yvo de Jong, and Tricla Willink, Communications Research Centre Canada, Adaptive Antennas and MIMO Systems for Wireless Communications, *Turbo-MIMO for Wireless Communications*, IEEE Communications Magazine, Oct. 2004, pp. 48-53.

(Continued)

*Primary Examiner* — Phuoc Doan
(74) *Attorney, Agent, or Firm* — McAndrews, Held & Malloy, Ltd.

(57) ABSTRACT

Methods and systems for processing signals in a receiver are disclosed herein and may comprise receiving WCDMA signals via M receive antennas, tracking a plurality of received clusters within the received WCDMA signals, and estimating a complex phase and amplitude of a portion of each of the received clusters. A single cluster may comprise an aggregate of received WCDMA signal paths and (M-1) phase shifters may be utilized for the estimating of the complex phase. Complex waveforms, comprising in-phase (I) and quadrature (Q) components for the received clusters within the received WCDMA signals, may be processed. The processed complex waveforms comprising the in-phase and quadrature components may be filtered to a WCDMA baseband bandwidth. A phase and/or amplitude for at least one of the received WCDMA signals may be adjusted utilizing the estimated complex phase and amplitude. The phase and/or amplitude may be adjusted continuously and/or at discrete intervals.

30 Claims, 6 Drawing Sheets

OTHER PUBLICATIONS

David J. Love, Purdue University, Robert W. Heath Jr., University of Texas at Austin and Wiroonsak Santipach and Michael L. Honig, Northwestern University; Adaptive Antennas and MIMO Systems for Wireless Communications, *What is the Value of Limited Feedback for MIMO Channels?*, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Marlin Haardt, Ilmenau University of Technology, Adaptive Antennas and MIMO Systems for Wireless Communications, *An Introduction to the Multi-User MIMO Downlink*, IEEE Communications Magazine, Oct. 2004, pp. 60-67.

Shahab Sanayei and Aria Nosratinia, University of Texas at Dallas, Adaptive Antennas and MIMO Systems for Wireless Communications, *Antenna Selection in MIMO Systems*, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, *Cooperative Communication in Wireless Networks*, IEEE Communications agazine, Oct. 2004, pp. 74-80.

* cited by examiner

METHOD AND SYSTEM FOR SINGLE WEIGHT (SW) ANTENNA SYSTEM FOR SINGLE CHANNEL (SC) MIMO SYSTEM FOR WCDMA

CROSS-REFERENCE TO RELATED APPLICATIONS/INCORPORATION BY REFERENCE

This application makes reference, claims priority to, and claims the benefit of U.S. Provisional Application Ser. No. 60/616,245 filed Oct. 6, 2004.

This application is related to the following applications, each of which is incorporated herein by reference in its entirety:

U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005.

FIELD OF THE INVENTION

Certain embodiments of the invention relate to processing received radio frequency (RF) signals. More specifically, certain embodiments of the invention relate to a method and system for single weight (SW) antenna system for single channel (SC) multiple-input multiple-output (MIMO) system for wideband code division multiple access (WCDMA).

BACKGROUND OF THE INVENTION

In most current wireless communication systems, nodes in the network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, code division multiple access (CDMA) based systems, time division multiple access (TDMA) based systems, wireless local area network (WLAN) systems, and orthogonal frequency division multiplexing (OFDM) based systems, such as IEEE 802.11 a/g, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from the shift underway from current voice-based services to next-generation wireless multimedia services that provide voice, video, and data transmission.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of M-1 interferers. Accordingly, N signals may be simultaneously transmitted in the same bandwidth using N transmit antennas, with the transmitted signal then being separated into N respective signals by way of a set of N antennas deployed at the receiver.

This type of systems may be referred to as multiple-input multiple-output (MIMO) systems. One attractive aspect of multi-antenna systems, in particular MIMOs., is the significant increase in system capacity which may be achieved by utilizing these transmission configurations. For a fixed overall transmitted power the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from the increased size, complexity, and power consumption. Providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and method for single weight (SW) antenna system for single channel (SC) MIMO system for WCDMA, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single weight (SW) antenna system for single channel (SC) MIMO system for WCDMA. In accordance with an exemplary aspect of the invention, a single weight generator may be utilized with a first portion of a received multipath signal in a first signal-processing path of a MIMO receiver adapted to receive WCDMA signals via M receive antennas, for example. The single weight generator may be adapted to generate a control signal, or a single weight signal, that may be utilized to control the first portion of the received multipath signal. More specifically, the control signal, or the SW signal, may be utilized within the first signal processing path to adjust a phase and/or amplitude of the first portion of the received multipath signal so that its phase and/or amplitude is equal to a phase and/or amplitude of a second portion of the received multipath signal. Furthermore, the signal weight generator may also generate control signals, or weights, which may be utilized for phase and/or amplitude adjustment during open loop (OL), closed loop 1 (CL1), and/or closed loop 2 (CL2) diversity mode of transmit processing of one or more WCDMA signals prior to transmission.

Figure 1A:
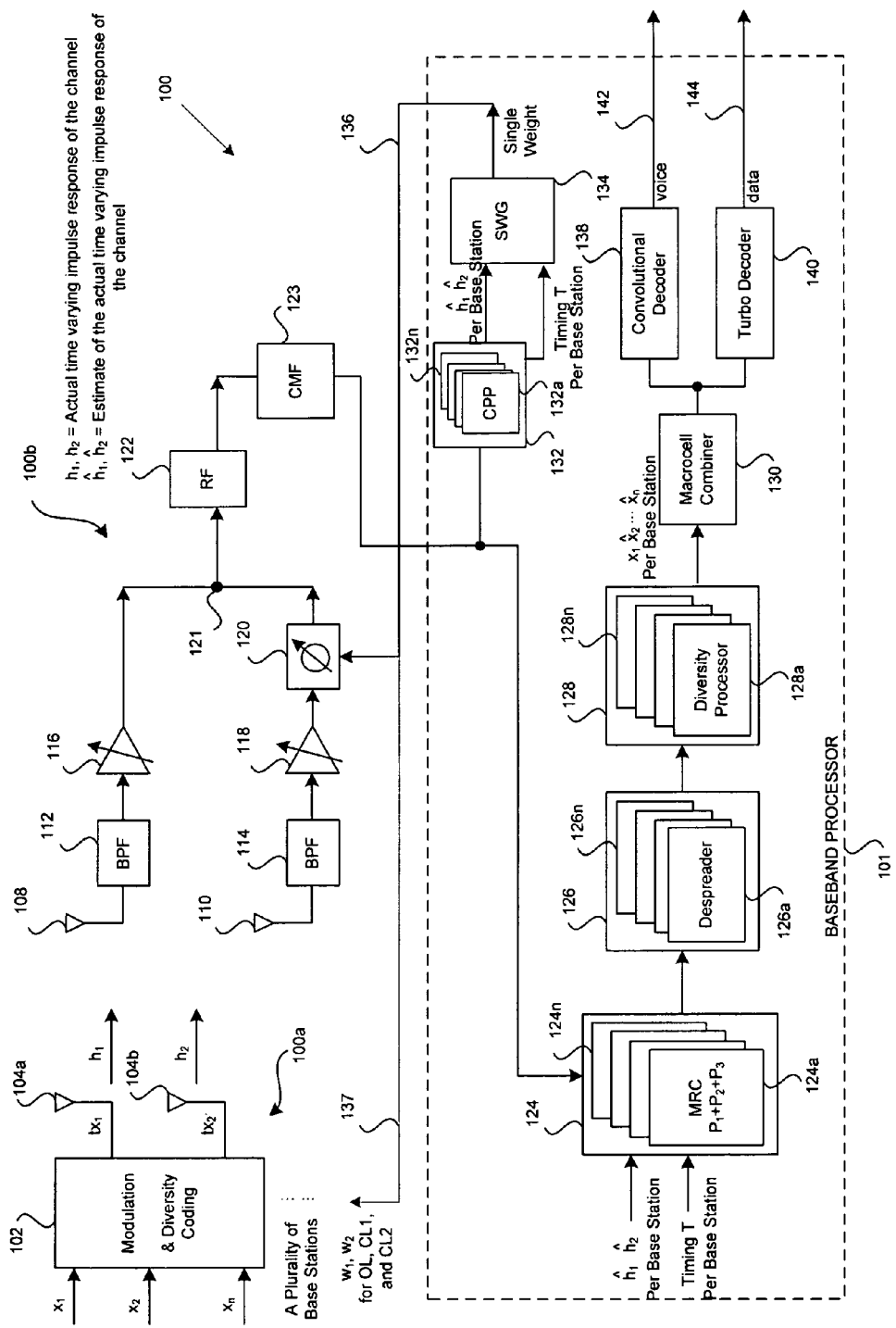
FIG. 1A is a block diagram of an exemplary multiple antenna receiver system for WCDMA, in accordance with an embodiment of the invention.

FIG. 1A is a block diagram of an exemplary multiple antenna receiver system for WCDMA, in accordance with an embodiment of the invention. Referring to FIG. 1A, there is shown a transmitter section 100a and a receiver section 100b. The transmitter section 100a may comprise a modulation and diversity coding block 102 and a plurality of antennas 104a and 104b. Data inputs $x_1, x_2, \ldots x_n$, may be inputs to the modulation and diversity coding block 102. Signals $tx_1$ and $tx_2$ may be output signals from the modulation and diversity coding block 102.

The receiver section 100b may comprise antennas 108 and 110, bandpass filters (BPFs) 112 and 114, variable gain low noise amplifiers (LNAs) 116 and 118, a phase shifter block 120, a radio frequency (RF) processing block 122, a channel matched filter (CMF) block 123, and a baseband processor 101. The baseband processor 101 may comprise a cluster path processor (CPP) block 132, a single weight generator (SWG) block 134, a maximum ratio combining (MRC) block 124, a despreader block 126, a diversity processor block 128, a macrocell combiner block 130, a bit rate processing block 131, a convolutional decoder block 138, and a turbo decoder block 140. The actual time varying impulse response of the channel may be represented by $h_1$ and $h_2$ per base station. The estimates of the actual time varying impulse response of the channel may be represented by $\hat{h}_1$ and $\hat{h}_2$ per base station.

On the transmit side 100a, the modulation and diversity coding block 102 may be adapted to generate modulated signals $tx_1, tx_2, \ldots, tx_n$ of the data inputs $x_1, x_2\, x_3$, which may be transmitted via antennas 104a and 104b over the channels having transfer functions $\hat{h}_1$ and $\hat{h}_2$.

On the receive side, the BPFs 112 and 114 may comprise suitable logic, circuitry, and/or code and may be adapted to receive as an input an RF signal from the antennas 108 and 110, respectively. The BPFs 112 and 114 may then limit the frequencies of the received multipath signal to a pre-determined band of frequencies, and output signals within that band of frequencies to the LNAs 116 and 118. The LNAs 116 and 118 may comprise suitable logic, circuitry, and/or code and may be adapted to receive an input signal, and amplify the signal while introducing negligible or no additional noise. The phase shifter block 120 may comprise suitable logic, circuitry and/or code and may be adapted to amplify a received input signal, phase shift the amplified signal and generate an output phase-shifted signal.

In one aspect of the invention, the phase shifter block 120 may be adapted to receive a single weight (SW) 136 from a single weight generator (SWG) 134 and shift the phase of a signal received at antenna 110 based on the SW value. In this regard, the phase-shifted signal may be in phase with the signal received at antenna 108 and, consequently, subsequent processing losses may be minimized.

The RF block 122 may comprise suitable logic, circuitry, and/or code and may be adapted to amplify and convert the received analog RF signal down to baseband. In an exemplary aspect of the invention, the RF block 122 may comprise a low noise amplifier, a voltage controlled oscillator (VCO), a low pass filter (LPF), and/or an analog-to-digital converter (A/D). The VCO within the RF block 122 may comprise suitable logic, circuitry, and/or code and may be adapted to output a signal of a specific frequency which may be pre-determined, or controlled by a voltage signal input to the VCO. The VCO signal may be mixed by a mixer with the RF signal received by the RF block 122. The LPF within the RF block 122 may comprise suitable logic, circuitry, and/or code and may be adapted to receive the mixed signal from the mixer, limit the frequencies of the mixed signal to a pre-determined range of frequencies up to a certain upper limit frequency, and output that range of frequencies as a baseband signal. The A/D block within the RF block 122 may comprise suitable logic, circuitry, and/or code that may be adapted to receive the limited analog baseband signal from the LPF and output a digital signal, which may sample the analog signal at a pre-defined rate.

The channel matched filter (CMF) block 123 may comprise suitable logic, circuitry, and/or code and may be adapted to filter the output of the RF block 122 so as to produce in-phase (I) and quadrature (Q) signal components. In this regard, in an embodiment of the invention, the CMF block 123 may comprise a pair of digital filters, for example, that may be adapted to filter the I and Q components to within the bandwidth of WCDMA baseband, for example 3.84 mHz.

The CPP block 132 may comprise a plurality of cluster processors that may be adapted to receive and process an output of the chip matched filter block 123. In the baseband receiver processor 101, the CPPs 132a, ..., 132n within the CPP block 132 may be partitioned into pairs of processors, wherein each pair of processor may be adapted to track timewise and estimate the complex phase and amplitude of the element in the cluster. A cluster may comprise an aggregate of received multipath signals with maximum (max) time difference that may be no more than 16×1/3.84e6 seconds, for example. Under these circumstances, the need for two processors is derived from the fact that the WCDMA standard facilitates a receiving mode in which the transmitted signal is transmitted over two antennas, which necessitates the two processors. These receiving modes comprise close loop 1 (CL1), close loop 2 (CL2), and STTD.

The CPP block 132 may be adapted to generate channel estimates $\hat{h}_1$ and $\hat{h}_2$ for the actual time varying impulse responses of the channel $h_1$ and $h_2$, respectively. The CPP 132 may also generate timing information T related to signals received by the antennas 108 and 110. Corresponding lock indicators $L_1$ and $L_2$ may also be generated per base station by the cluster processors 132a, ..., 132n. The lock indicators $L_1$ and $L_2$ may provide an indication of which components in the corresponding estimates comprise valid component values. In one embodiment of the invention, cluster path processors 132a, ..., 132n may be configured to operate in pairs when a transmitted signal is transmitted by two antennas, where the two antennas may be located in the same base station, or at a different base stations. The channel estimates $\hat{h}_1$ and $\hat{h}_2$, the lock indicators $L_1$ and $L_2$, as well as the timing information T may be communicated to the single weight generation (SWG) block 134 and the maximum-ratio combining (MRC) block 124 for further processing. The CPP block 132 may be adapted to determine estimates of the actual time varying impulse response of the channel and recover channels on a per base station basis.

U.S. application Ser. No. 11/173,854 provides a description of signal clusters and is hereby incorporated herein by reference in its entirety.

The SWG block 134 may comprise suitable circuitry, logic, and/or code and may be adapted to process channel function estimates and RF signal timing information T and generate a single weight (SW) 136. The SW 136 may be utilized by the phase shifter block 120, for example, to phase-shift an RF signal received at antenna 110 and generate an RF signal that is in-phase with a signal received at antenna 108. The SW 136 may be also communicated to the LNAs 116 and/or 118 to indicate a signal amplification level, for example. In another aspect of the invention, the SWG 134 may be adapted to generate a plurality of weights 137 and 136, such as weights $w_1$ and $w_2$, which may be communicated to the transmit side 100a and utilized for phase and/or amplitude adjustment during open loop (OL), closed loop 1 (CL1), and/or closed loop 2 (CL2) diversity mode of transmit processing.

The maximum-ratio combining block 124 may comprise suitable logic, circuitry and/or code to receive timing reference signals, T, and channel estimates and lock indicators, ($\hat{h}1,L1$) and ($\hat{h}2,L2$), from the corresponding cluster path processor block 132, which may be utilized by the maximum-ratio combining block 124 to process received signals from a chip matched filter (CMF) block, for example. The maximum ratio combining block 124 may utilize channel estimate components that are valid in accordance with the corresponding lock indicator. Channel estimate components that are not valid, in accordance with the corresponding lock indicator, may not be utilized. The maximum-ratio combining block 124 may be adapted to provide a combining scheme or mechanism for implementing a rake receiver which may be utilized with adaptive antenna arrays to combat noise, fading, and/or co-channel interference.

In accordance with an embodiment of the invention, the maximum-ratio combining block 124 may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon maximal ratio combining, optimal combining, and/or other rule. The highest attainable SNR may be also related to the RMS noise level that may be introduced to each received individual distinct path signal within a received signal cluster. The maximum-ratio combining block 124 may be also adapted to utilize the same proportionality constant for the individual distinct path signals, in which case the rake receiver may be known as an "equal gain combiner".

In one embodiment of the invention, the assignment of fingers in the maximum-ratio combining block 124 may be based on channel estimates h1 and h2 from the cluster path processor block 132. The proportionality constants utilized in the maximum-ratio combining block 124 may be based on the valid channel estimates, $\hat{h}1$ and $\hat{h}2$, from the cluster path processor block 432.

The despreader (DS) block 126 may comprise a plurality of despreader blocks 126a, ..., 126n. Each of the despreader blocks 126a, ..., 126n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 126 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 132 and the MRC block 124, the DS block 126 may be assigned on a per base station basis, with the MRC block 124 communicating with the DS block 126 that may be assigned to the same base stations.

The diversity processor 128, comprising a plurality of diversity processor blocks 128a, . . . , 128n, may comprise suitable logic, circuitry, and/or code that may be adapted to combine signals transmitted from multiple antennas in diversity modes. The diversity modes may comprise OL, CL1 and CL2. The diversity processor 128 may combine signals transmitted from multiple antennas that are located at the same base station. In accordance with an embodiment of the invention, the diversity mode signals may be processed in a single hardware block requiring the same received signal inputs from maximum-ratio combining block 124. Similarly with the cluster path processors 132, the maximum-ratio combining blocks 124, and the despreader blocks 126, the diversity processors 128 may be assigned on a per base station basis, with the diversity processors 128 communicating with despreader blocks 126 that may be assigned to the same base stations.

The macrocell combiner 130 may comprise suitable logic, circuit and/or code and may be adapted to achieve macroscopic diversity. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which may be obtained via independently fading paths received from two or more different antennas but only one receiving co-site.

The bit rate processing block 131 may comprise suitable logic, circuitry and/or code to process frames of data received from the macrocell combiner 130. The processing may further comprise depuncturing, and deinterleaving data in the received frame, and further determining a rate at which processed frames are communicated in output signals.

The convolutional decoder 138 may comprise suitable logic, circuitry, and/or code that may be utilized to handle decoding of convolutional codes as indicated in the 3GPP specification. The output of the convolutional decoder may be a digital signal, which comprises voice information, suitable for processing by a voice-processing unit. The turbo decoder 140 may comprise suitable logic, circuitry and/or code that may be utilized to handle decoding of turbo codes as indicated in the 3GPP specification. The output of the turbo decoder 140 may be a digital signal, which has data information, such that it may be suitable for use by a video display processor.

In operation, the transmitter side 100a may be adapted to modulate the input data signals $x_1, x_2 \ldots x_n$ and generate the output signal $tx_1, tx_2$ which may be transmitted via antennas 104a and 104b over air. Each over the air path, or a channel, may be characterized by a corresponding time varying impulse response functions $h_1$ and $h_2$. The transmitted output signals $tx_1, tx_2$ may then be received as multipath signals having actual time varying impulse responses of the channel $h_1$ and $h_2$ via the antennas 108 and 110. On the receiver side 100b, the transmitted output signals $tx_1, tx_2$ may be received at the antennas 108 and 110, and may be processed by the BPFs 112 and 114, the LNAs 116 and 118, and the phase shifter block 120. The LNAs 116 and 118 may be adjusted so that signals received at both antennas 108 and 110 have a balanced gain at point 121. The balanced gain signal may then be communicated to the RF block 122 for processing. The resulting digitized output signal from the RF block 122 may be filtered by the CMF block 123 to match the WCDMA signal bandwidth, for example.

The filtered output of the CMF 123 may be processed by the CPP 132a, for example, which may generate a set of channel estimates and lock indicators, $(\hat{h}1,L1)$, and a timing reference signal T1. Processor 132b, for example, may generate a set a channel estimates and lock indicators, $(\hat{h}2,L2)$, and a timing reference signal T2. Processor 132a and processor 132b may generate channel estimates and timing reference signals based on received signals from a single base station. There may be a deterministic relationship between the timing reference signals such that given, for example, T1, it may be possible to determine T2, and/or vice versa. In such case, only one timing reference signal, T, which may be based on at least one of T1 or T2, may be communicated to the maximum-ratio combining block 424.

The maximum-ratio combining block 124 may be adapted to utilize the channel estimates and lock indicators $(\hat{h}1,L1)$, $(\hat{h}2,L2)$ and timing information T per base station to assign rake fingers to received individual distinct path signals and to assign proportionality constants to each finger. Received individual distinct path signals may be processed in the maximum-ratio combining block 124 as signal clusters comprising a plurality of received individual distinct path signals. In an embodiment of the invention, the maximum-ratio combining block 124 may assign a time, T(n), to the $n^{th}$ grid element of the CPP 132, where the plurality of times T(n) may be based on the timing reference T. Given a time assignment, and a time offset, $t_{off}$, a given CPP 132n, may detect an individual distinct path signal that is received during a time interval starting at $[T(n)-t_{off}/2]$, and ending at $[T(n)+t_{off}/2]$.

The individual distinct path signals received collectively for each CPP 132 may constitute a signal cluster. The relationship of the values T(n) among the processing elements of the CPP 132 in the receiver may be such that $T(n+1)-T(n)$ is equal to a constant value for values of n among the set of fingers. Thus, once T is determined, the timing relationships for the receipt of the plurality of individual distinct path signals constituent in the signal cluster may be determined. The time offset value, $t_{off}$, may represent a time duration, which is at least as long as the period of time required for transmitting the plurality of chips contained in a symbol. For example, if the symbol comprises 16 chips, and the W-CDMA chip rate is $3.84 \times 106$ chips/second, then the time offset $t_{off}$ may be $(16/3.84 \times 106)$ seconds or approximately 4 microseconds.

Embodiments of the invention may not be limited to values of the difference $T(n+1)-T(n)$ being constant among all n fingers in a rake receiver. However, each value, T(n), may be based on the timing reference signal, T.

The maximum-ratio combining block 124 may proportionately scale and add the received individual distinct path signals to produce a chip level output, which may be communicated to the despreader block 126. The despreader block 126 may be adapted to despread the chip level signal received from the maximum-ratio combining block 124 to generate estimates of the original transmitted signals. The diversity processor block 128 may be adapted to provide diversity processing and to generate output data estimates on a per base station basis. The macrocell combiner block 130 may achieve macroscopic diversity when a received signal has been transmitted by a plurality of base stations. The bit rate processing block 131 may perform processing tasks comprising depuncture and deinterleave on received frames of data that are communicated in received individual distinct path signals. The bit rate processing block 131 may determine a rate at which to communicate processed frames of data to the convolutional decoder block 138, and/or the turbo decoder block 140. The convolution decoder block 138 may be adapted to perform convolutional decoding on the voice portion of the signal generated from an output of the bit rate processing block 131. The turbo decoder block 440 may be adapted to perform turbo decoding on the data portion of the signal generated from an output of the bit rate processing block 131.

Figure 1B:
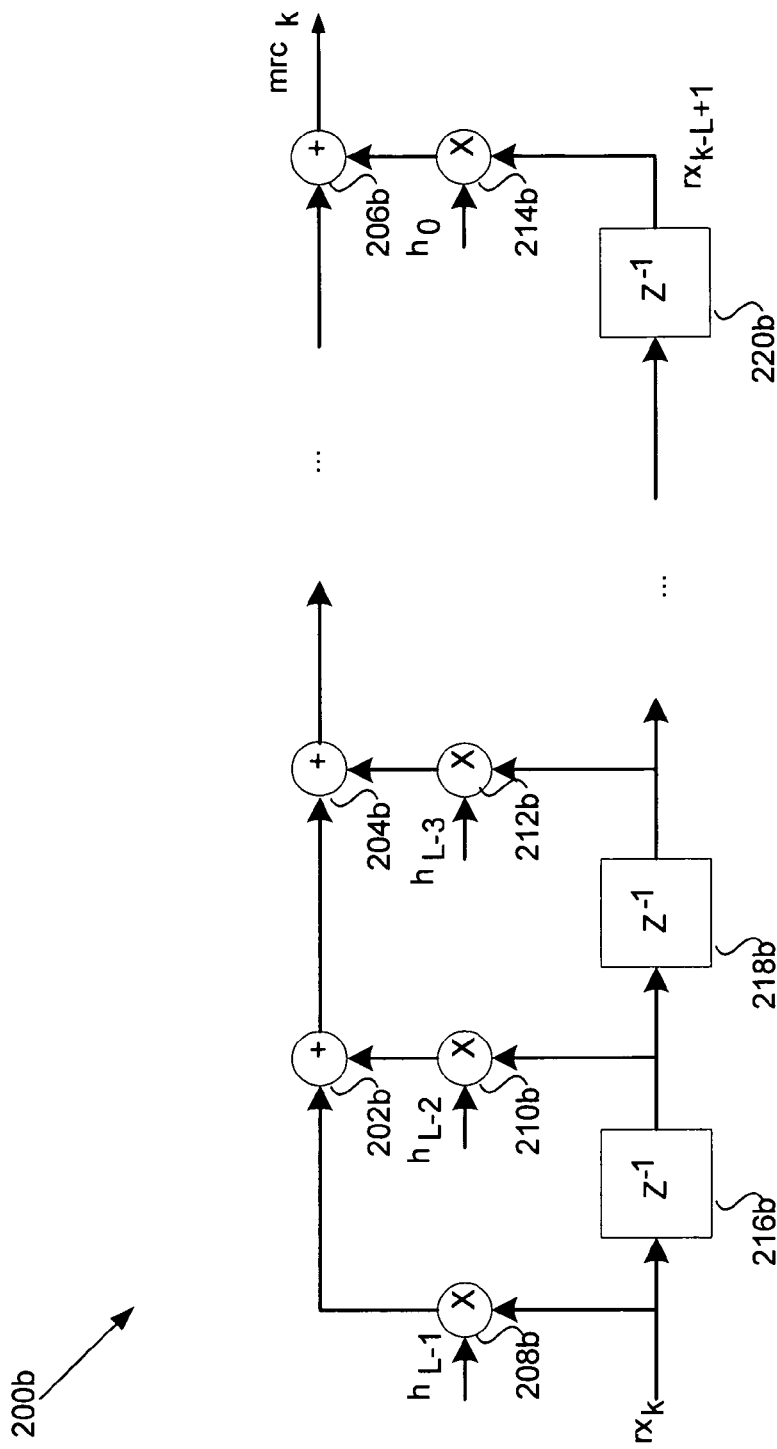
FIG. 1B illustrates an exemplary maximum-ratio combining (MRC) block, in accordance with an embodiment of the invention.

FIG. 1B illustrates an exemplary maximum-ratio combining (MRC) block, in accordance with an embodiment of the invention. Referring to FIG. 1B, the maximum-ratio combining (MRC) block 200*b* may comprise a plurality of adders 202*b*, . . . , 206*b*, a plurality of multipliers 208*b*, . . . , 214*b*, and a plurality of delay blocks 216*b*, . . . , 220*b*. In one embodiment of the invention, the MRC block 200*b* may receive a plurality of channel estimates $h_{ik}$ (i=0,1, . . . , L−1) from a corresponding cluster path processor block. For example, the MRC block 200*b* may receive estimate vectors ĥ1 and ĥ2 of the actual time varying impulse response of a channel, from a cluster path processor. Each of the estimate vectors ĥ1 and ĥ2 may comprise a cluster grid of channel estimates $h_{ik}$ (i=0,1, . . . , L−1), where L may indicate the width of the cluster grid of estimates and may be related to the delay spread of the channel.

In operation, the MRC block 200*b* may be adapted to implement the following equation:

$$mrc_k = \sum_{i=0}^{L-1} h_{L-1-i} \cdot rx_{k-i},$$

where $mrc_k$ is the output of the MRC block 200*b*, hL−1−I is the plurality of channel estimates corresponding to a channel estimate vector, such as ĥ1 and ĥ2, and $rx_k$ is a filtered complex input signal. The MRC block 200*b* may be adapted to add individual distinct path signals together in such a manner to achieve a high signal to noise ratio (SNR) in an output signal mrck.

The MRC block 200*b* may receive a filtered complex signal $rx_k$ from a chip matched filter (CMF), for example. The filtered complex signal rxk may comprise in-phase (I) and quadrature (Q) components of a received signal. Furthermore, the filtered complex signal $rx_k$ may be gated by cluster path processor (CPP) output strobes derived from a CPP timing reference, for example. Channel estimates $hi_k$ (i=0,1, . . . , L−1) may be applied to the CMF output $rx_k$ beginning with the last in time, hL−1, and proceeding with channel estimates hL−2, . . . , h0, utilizing multiplier blocks 208*b*, . . . , 214*b*, respectively. The filtered complex input signal $rx_k$ may be continuously delayed by delay blocks 216*b*, . . . , 220*b*. Each delayed output of the delay blocks 216*b*, . . . , 220*b* may be multiplied by the multiplier blocks 210*b*, . . . , 214*b*, respectively, utilizing corresponding channel estimates $h_{ik}$. The outputs of the multipliers 202*b*, . . . , 206*b* may be added to generate the output signal $mrc_k$, thereby implementing the above-referenced MRC equation.

Figure 2:
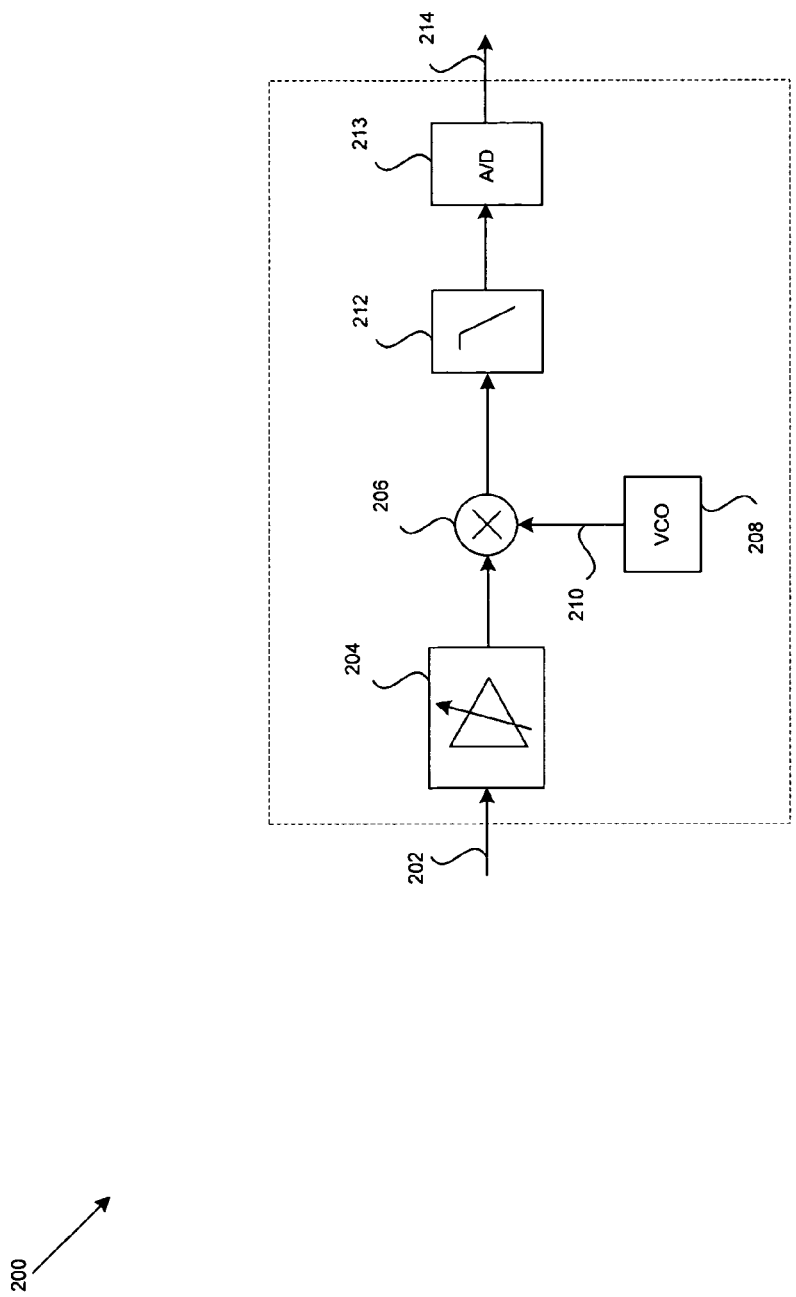
FIG. 2 is a block diagram of a radio frequency (RF) processing block that may be utilized in accordance with an aspect of the invention.

FIG. 2 is a block diagram of a radio frequency (RF) processing block that may be utilized in accordance with an aspect of the invention. Referring to FIG. 2, the RF processing block 200 may comprise suitable logic, circuitry, and/or code and may be adapted to amplify and convert the received analog RF signal down to baseband and then digitize it. In an exemplary aspect of the invention, the RF processing block 200 may comprise an LNA 204, a voltage controlled oscillator (VCO) 208, a mixer 206, a low pass filter (LPF) 212, and an analog-to-digital converter (A/D) 213. The LNA 204 may be adapted to receive an RF signal 202 and amplify it based on a determined gain level. The VCO 208 may comprise suitable logic, circuitry, and/or code and may be adapted to output a signal of a specific frequency, which may be pre-determined, or controlled, by a voltage signal input to the VCO. The VCO signal 210 may be mixed by the mixer 206 with the amplified signal received from the LNA 204. The LPF 212 may comprise suitable logic, circuitry, and/or code and may be adapted to receive the mixed signal from the mixer 206. The frequencies of the mixed signal may be limited by the LPF 212 to a determined range of frequencies up to a certain upper frequency limit, and the LPF 212 may output that range of frequencies as a baseband signal to the A/D 213. The A/D converter 213 may comprise suitable logic, circuitry, and/or code that may be adapted to receive the limited analog baseband signal from the LPF 212 and output a digital signal 214, which may sample the analog signal at a pre-defined rate.

Figure 3:
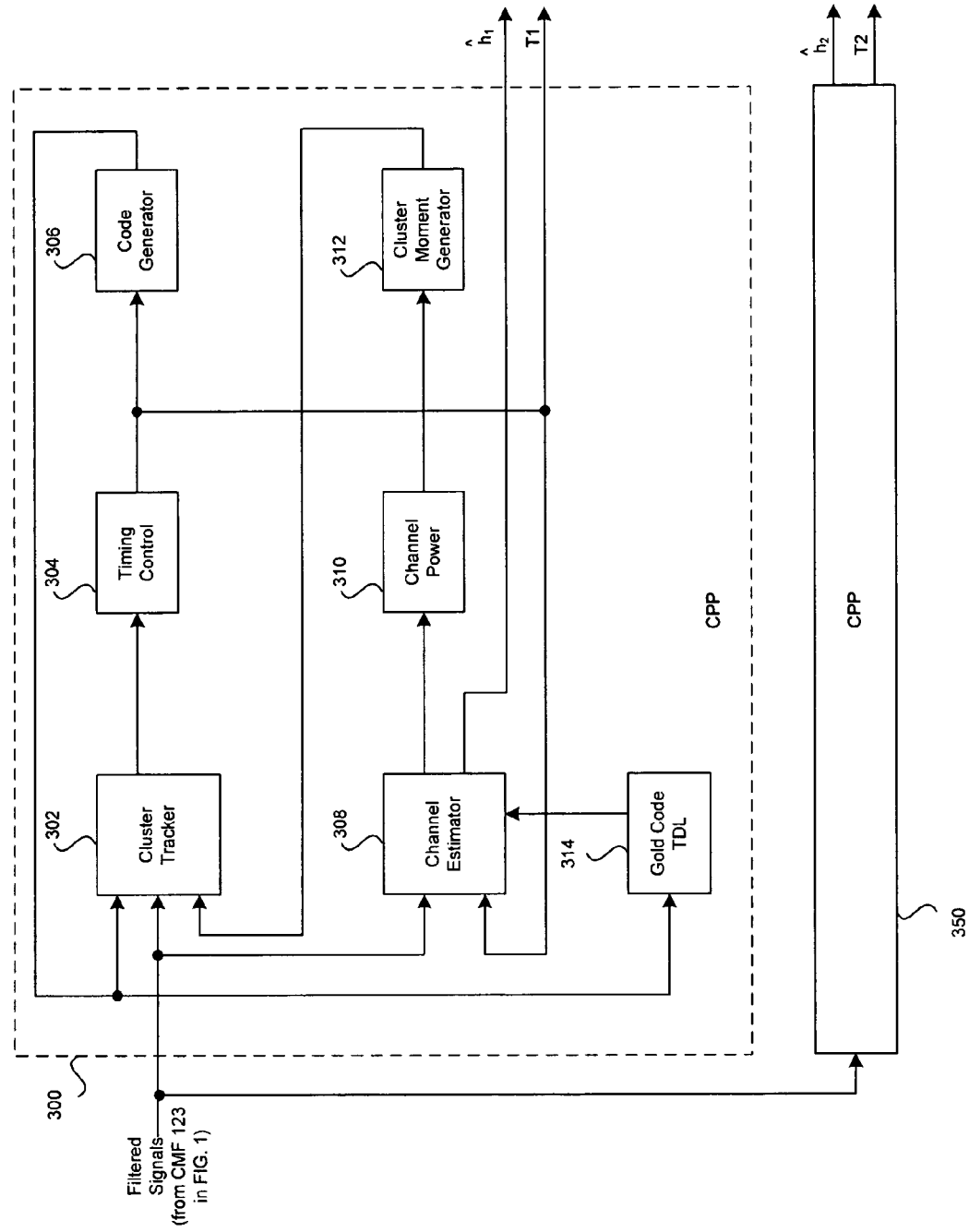
FIG. 3 is a block diagram of exemplary cluster path processor in FIG. 1A, for example, in accordance with an embodiment of the invention.

FIG. 3 is a block diagram of exemplary cluster path processor in FIG. 1A, for example, in accordance with an embodiment of the invention. Referring to FIG. 3, there are shown cluster path processor (CPP) blocks 300 and 350. The CPP block 300, and the CPP block 350, may comprise a cluster tracker (CT) block 302, a timing control (TC) block 304, a code generator (CG) block 306, a channel estimator (CE) block 308, a channel power (CP) block 310, a cluster moment generator (CMG) block 312, and a Gold code tapped delay line (GCTDL) block 314. The CPP blocks 300 and 350 have as an input a filtered data signal from the CMF block 206 (FIG. 2). The CPP block 300 may generate outputs ĥ$_1$ and T1, and the CPP block 350 may generate outputs ĥ$_2$ and T2, where ĥ$_1$ and ĥ$_2$ may be estimates of the actual time varying impulse response of the channel, and T1 and T2 may be the cluster timing correction signals for the signal elements of ĥ$_1$ and ĥ$_2$, respectively.

The cluster tracker block 302 may comprise suitable logic, circuitry, and/or code that may be adapted to time-wise track a received multipath signal cluster. The timing control block 304 may comprise suitable logic, circuitry, and/or code that may be adapted to monitor a signal cluster aggregate arrival time and generate time correction signals. The CG block 306 may comprise suitable logic, circuitry, and/or code that may be adapted to time-wise serially generate required Gold codes and orthogonal variable spreading factor (OVSF) codes at a timely defined rate.

The channel estimate block 308 may comprise suitable logic, circuitry, and/or code that may be adapted to estimate complex phases and amplitude of each multipath in the signal cluster. The CP block 310 may comprise suitable logic, circuitry, and/or code that may be adapted to calculate an aggregate power of the signal cluster. The CMG block 312 may comprise suitable logic, circuitry, and/or code that may be adapted to calculate a first moment, or a weighted "center-of-gravity" in time, of a signal cluster. The GCTDL block 314 may comprise suitable logic, circuitry, and/or code that may be adapted to delay the Gold codes and OVSF codes with a fixed time delay of one chip, for a total delay of 16 chips. A chip may comprise $1/(3.84 \times 10^6)$ seconds in duration, for example.

In operation, a digitally filtered signal may be communicated to an input of the cluster tracker block 302 and to an input of the channel estimate block 308. The cluster tracker block 302 may also receive as inputs codes generated by the CG block 306 and cluster timing information generated by the CMG block 312. The cluster tracker block 302 may process the inputs to identify in time the location of the signal cluster of the energy path, and a time value for the signal cluster may be comprise output. The output of the cluster tracker block 302 may be communicated to an input of the timing control block 304, where the timing control block 304 may monitor this input to generate a timing correction signal T1 for the signal cluster. The timing correction signal T1 may be communicated to an input of the CG block 306, to an input of the channel estimate block 308, and as an output of the CPP block 300. The CG block 306 may receive the timing correction signal T1 and may generate Gold codes and OVSF codes at a pre-defined rate. These codes may be utilized by the channel estimate block 308 to despread each multipath signal in the cluster. These codes may be output by the CG block 306, and communicated to the input of the cluster tracker block 302 and an input of the GCTDL block 314.

The GCTDL 314 may receive as an input the Gold and OVSF codes output by the CG block 306, may delay these codes, and may output delayed versions of the codes that may be communicated to the channel estimate block 308. The channel estimate block 308 may process the digitally filtered data from the CMF block 206, the timing correction signal T1, and the output of the GCTDL block 314, to generate channel estimate $\hat{h}_1$ of the actual time varying impulse response of the channel. The channel estimate $\hat{h}_1$ may be the result of the multipath signals in the signal cluster that originated from a specific transmit antenna. When the multipath signals have been despread by the CE 308, the portions of the signal cluster that are not part of a signal of interest, may ideally cancel each other as pseudo-random white noise.

The channel estimate $\hat{h}_1$ from the channel estimate block 308 may be communicated as an output of the CPP block 300 and to the CP block 310. The CP block 310 may receive the output of the channel estimate block 308 and may calculate the aggregate power of the multipath signals in the signal cluster of the received path from the transmit antenna. The power calculation may be an output of the CP block 310 and may be communicated to the CMG block 312. The CMG block 312 may calculate the first moment, or the time coordinate, of the signal cluster and may communicate the time coordinate to the cluster tracker block 302. The time coordinate may be utilized by the cluster tracker block 302 to track the signal cluster, for example.

Similarly, the CPP block 350 may receive as an input the filtered data from the CMF block 206, and may communicate as outputs channel estimate $\hat{h}_2$ of the actual time varying impulse response of the channel and a timing correction signal T2. Under these circumstances, the need for two CPPs may be because the WCDMA standard facilitates diversity transmitting mode in which the RF signal may be transmitted over two antennas from each base station. These diversity transmit modes comprise closed loop mode 1 (CL1), closed loop mode 2 (CL2), and/or an open loop mode that may also be referred to as space-time transmit diversity (STTD). Alternatively, the second CPP may process signal clusters that may have originated from another base station. A cluster may be an aggregate of received multipath signals with a maximum time difference of no more than $16/(3.84\times10^6)$ seconds, for example.

Notwithstanding, the cluster time of $16/(3.84\times10^6)$ seconds should not be considered a constraint of the method and the apparatus of the invention but rather a design choice for the embodiment of the invention utilizing the WCDMA standard requirements. Different embodiments of the invention may require different cluster times. Additionally, although two CPPs may be needed per base station because of the present WCDMA standard, this should not be considered a limitation on the number of CPPs that may be assigned to a base station. Future implementations of the invention may assign a plurality of CPPs per base station as needed because of the number of transmitting antennas at the base station, for example.

Figure 4:
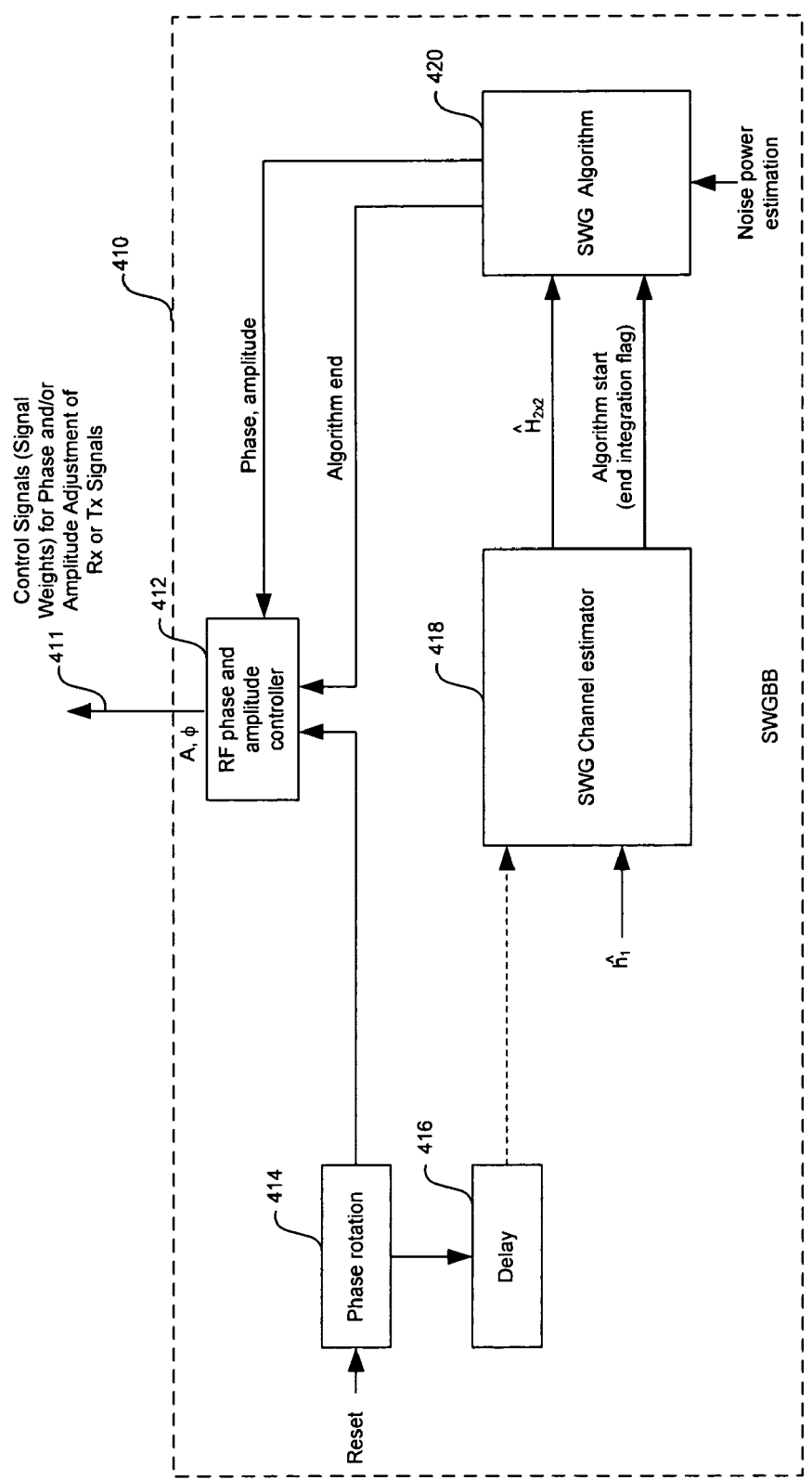
FIG. 4 is a block diagram of an exemplary single weight generator baseband (SWGBB) processor that may be utilized in accordance with an aspect of the invention.

FIG. 4 is a block diagram of an exemplary single weight generator baseband (SWGBB) processor that may be utilized in accordance with an aspect of the invention. Referring to FIG. 4, the SWGBB processor 410 may comprise a phase rotation start controller 414, a delay 416, a SWG channel estimator 418, a single weight generator (SWG) algorithm block 420, and a RF phase and amplitude controller 412. The description of the SWGBB processor 410 provides a more detailed functional description of the SWG 134 that is shown in FIG. 1A, where a two-transmit and two-receive antenna system is illustrated.

In operation, a reset signal may be utilized to start the phase rotation start controller 414 during the rotation operation. Estimates from the delay 416 as well as estimates of the actual time varying impulse response estimate $\hat{h}_1$ of the channels associated with the receive antennas, such as antennas 108 and 110 in FIG. 1A, may be communicated to the channel estimator 418 for processing. When processing is complete, the channel estimator 418 may communicate the matrix $\hat{H}_{2\times2}$ to the SWG algorithm block 420 and may indicate to the SWG algorithm block 420 that the determination of the appropriate phase and/or amplitude correction may start. The SWG algorithm block 420 may utilize an estimation of the noise power and interference in determining the phase and amplitude values. The SWG algorithm block 420 may indicate to the RF phase and amplitude controller 412 the end of the weight determination operation and may then transfer to the RF phase and amplitude controller 412 the determined phase and/or amplitude values. The RF phase and amplitude controller 412 may then output one or more control signals 411 that may be utilized to modify a phase and/or amplitude for a portion of a received multipath signal and/or for a portion of a signal prior to transmission.

While the SWGBB processor 410 is adapted to generate control signals for a two-transmit two-receive antenna system, the invention is not limited in this manner. For example, the SWG channel estimator 418 may be adapted to generate a $\hat{H}M\times N$ matrix, where M represents the number of receive antennas and N represents the number of transmit antennas. U.S. application Ser. No. 11/173,252 provides a detailed description of a single weight generator baseband processor and is hereby incorporated herein by reference in its entirety.

Figure 5:
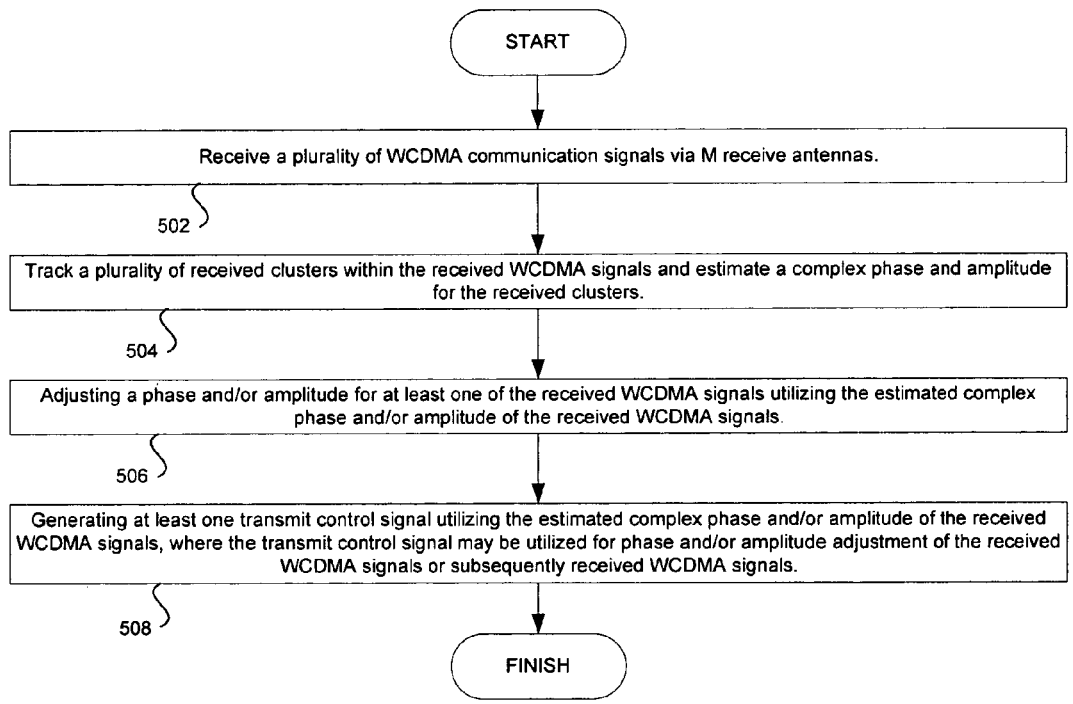
FIG. 5 is a flow diagram illustrating exemplary steps for processing signals in a receiver, in accordance with an embodiment of the invention.

FIG. 5 is a flow diagram illustrating exemplary steps for processing signals in a receiver, in accordance with an embodiment of the invention. Referring to FIG. 5, at 502, a plurality of WCDMA communication signals may be received via M receive antennas. At 504, a plurality of received clusters within the received WCDMA signals may be tracked and a complex phase and amplitude for the received clusters may be estimated. At 506, a phase and/or amplitude for at least one of the received WCDMA signals may be adjusted utilizing the estimated complex phase and/or amplitude of the received WCDMA signals. At 508, one or more transmit control signals may be generated utilizing the estimated complex phase and/or amplitude of the received WCDMA signals, where the transmit control signal may be utilized for phase and/or amplitude adjustment prior to transmission of a subsequently received WCDMA signals.

Certain embodiments of the invention may be found in a method and system for processing signals in a receiver. Aspects of the method may comprise receiving WCDMA signals via M receive antennas 108 to 110, for example, tracking a plurality of received clusters within the received WCDMA signals, and estimating a complex phase and amplitude of a portion of each of the received clusters. A single cluster may comprise an aggregate of received WCDMA signal paths and (M-1) phase shifters 120, for example, may be utilized for the estimating of the complex phase. Complex waveforms, comprising in-phase (I) and quadrature (Q) components for the received clusters within the received WCDMA signals, may be processed. The processed complex waveforms comprising the in-phase and quadrature components may be filtered to a WCDMA baseband bandwidth.

A phase and/or amplitude for at least one of the received WCDMA signals may be adjusted utilizing the estimated complex phase and amplitude. The phase and/or amplitude may be adjusted continuously and/or at discrete intervals. The received clusters within the WCDMA signals may be transmitted via at least one antenna 104a to 104b, for example, from at least one transmitting base station. A channel estimate of a time varying impulse response for at least one of the received clusters may be estimated within the received WCDMA signals. A transmit control signal may be generated utilizing the channel estimate of the time varying impulse response. The generated transmit control signal may be utilized for phase and/or amplitude adjustment of the received WCDMA signals or subsequently received WCDMA signals. The transmit control signal may be generated via a single weight generator.

Another embodiment of the invention may provide a machine-readable storage, having stored thereon, a computer program having at least one code section executable by a machine, thereby causing the machine to perform the steps as described above for processing signals in a receiver.

Aspects of the system may comprise a plurality of M receive antennas 108 to 110, for example, that receive WCDMA signals. A plurality of received clusters within the received WCDMA signals may be tracked by a channel estimator 418. The channel estimator 418 may be adapted to estimate a complex phase and/or amplitude of one or more of the received clusters. A single cluster may comprise an aggregate of received WCDMA signal paths, and (M-1) phase shifters may be utilized for the estimating of the complex phase. Complex waveforms comprising in-phase (I) and quadrature (Q) components of the received clusters within the received WCDMA signals may be processed and filtered by a filter to generate signals within WCDMA baseband bandwidth. A phase and/or amplitude for one or more of the received WCDMA signals may be adjusted by a processor 410 utilizing the estimated complex phase and amplitude.

The phase and/or amplitude may be adjusted continuously and/or at discrete intervals. The received clusters within the WCDMA signals may be transmitted via at least one antenna 104a to 104b, for example, from at least one transmitting base station. A channel estimate of a time varying impulse response for at least one of the received clusters within the received WCDMA signals may be generated by a channel estimator 418. A transmit control signal may be generated by the channel estimator 418 utilizing the channel estimate of the time varying impulse response. The generated transmit control signal may be utilized for phase and/or amplitude adjustment of the received WCDMA signals or subsequently received WCDMA signals. The transmit control signal may be generated via a single weight generator 420.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a receiver, the method comprising:
   receiving WCDMA signals via M receive antennas;
   tracking a plurality of received clusters within said received WCDMA signals; and
   estimating a complex phase and amplitude of at least a portion of each of said plurality of received clusters, wherein a single cluster comprises an aggregate of received WCDMA signal paths, and wherein (M-1) phase shifters are utilized for said estimating of said complex phase.

2. The method according to claim 1, comprising processing complex waveforms comprising in-phase (I) and quadrature (Q) components for said plurality of received clusters within said received WCDMA signals.

3. The method according to claim 2, comprising filtering said processed complex waveforms comprising said in-phase and quadrature components to a WCDMA baseband bandwidth.

4. The method according to claim 1, comprising adjusting at least one of a phase and amplitude for at least one of said received WCDMA signals utilizing said estimated complex phase and amplitude.

5. The method according to claim 4, wherein said at least one of said phase and amplitude is adjusted continuously.

6. The method according to claim 4, wherein said at least one of said phase and amplitude is adjusted at discrete intervals.

7. The method according to claim 1, wherein said plurality of received clusters within said WCDMA signals is transmitted via at least one antenna from at least one base transmit station.

8. The method according to claim 1, comprising generating at least one channel estimate of a time varying impulse response for at least one of said plurality of received clusters within said received WCDMA signals.

9. The method according to claim 8, comprising generating at least one transmit control signal utilizing said generated at least one channel estimate of said time varying impulse response, wherein said generated at least one transmit control signal is utilized for at least one of phase and amplitude adjustment of said received WCDMA signals or subsequently received WCDMA signals.

10. The method according to claim 9, wherein said at least one transmit control signal is generated via a single weight generator.

11. A machine-readable storage having stored thereon, a computer program having at least one code section for processing signals in a receiver, the at least one code section being executable by a machine for causing the machine to perform steps comprising:
receiving WCDMA signals via M receive antennas;
tracking a plurality of received clusters within said received WCDMA signals; and
estimating a complex phase and amplitude of at least a portion of each of said plurality of received clusters, wherein a single cluster comprises an aggregate of received WCDMA signal paths, and wherein (M-1) phase shifters are utilized for said estimating of said complex phase.

12. The machine-readable storage according to claim 11, comprising code for processing complex waveforms comprising in-phase (I) and quadrature (Q) components for said plurality of received clusters within said received WCDMA signals.

13. The machine-readable storage according to claim 12, comprising code for filtering said processed complex waveforms comprising said in-phase and quadrature components to a WCDMA baseband bandwidth.

14. The machine-readable storage according to claim 11, comprising code for adjusting at least one of a phase and amplitude for at least one of said received WCDMA signals utilizing said estimated complex phase and amplitude.

15. The machine-readable storage according to claim 14, wherein said at least one of said phase and amplitude is adjusted continuously.

16. The machine-readable storage according to claim 14, wherein said at least one of said phase and amplitude is adjusted at discrete intervals.

17. The machine-readable storage according to claim 11, wherein said plurality of received clusters within said WCDMA signals is transmitted via at least one antenna from at least one base transmit station.

18. The machine-readable storage according to claim 11, comprising code for generating at least one channel estimate of a time varying impulse response for at least one of said plurality of received clusters within said received WCDMA signals.

19. The machine-readable storage according to claim 18, comprising code for generating at least one transmit control signal utilizing said generated at least one channel estimate of said time varying impulse response, wherein said generated at least one transmit control signal is utilized for at least one of phase and amplitude adjustment of said received WCDMA signals or subsequently received WCDMA signals.

20. The machine-readable storage according to claim 19, wherein said at least one transmit control signal is generated via a single weight generator.

21. A system for processing signals in a receiver, the system comprising:
a plurality of M receive antennas that are operable to receive WCDMA signals;
a channel estimator that is operable to track a plurality of received clusters within said received WCDMA signals; and
said channel estimator is operable to estimate a complex phase and amplitude of at least a portion of each of said plurality of received clusters, wherein a single cluster comprises an aggregate of received WCDMA signal paths, and wherein (M-1) phase shifters are utilized for said estimating of said complex phase.

22. The system according to claim 21, comprising a filter that is operable to process complex waveforms comprising in-phase (I) and quadrature (Q) components for said plurality of received clusters within said received WCDMA signals.

23. The system according to claim 22, wherein said filter is operable to filter said processed complex waveforms comprising said in-phase and quadrature components to a WCDMA baseband bandwidth.

24. The system according to claim 21, comprising at least one processor that is operable to adjust at least one of a phase and amplitude for at least one of said received WCDMA signals utilizing said estimated complex phase and amplitude.

25. The system according to claim 24, wherein said at least one processor is operable to adjust said at least one of said phase and amplitude continuously.

26. The system according to claim 24, wherein said at least one processor is operable to adjust said at least one of said phase and amplitude at discrete intervals.

27. The system according to claim 21, wherein said plurality of received clusters within said WCDMA signals is transmitted via at least one antenna from at least one base transmit station.

28. The system according to claim 21, comprising a channel estimator that is operable to generate at least one channel estimate of a time varying impulse response for at least one of said plurality of received clusters within said received WCDMA signals.

29. The system according to claim 28, wherein said channel estimator is operable to generate at least one transmit control signal utilizing said generated at least one channel estimate of said time varying impulse response, wherein said generated at least one transmit control signal is utilized for at least one of phase and amplitude adjustment of said received WCDMA signals or subsequently received WCDMA signals.

30. The system according to claim 29, wherein said channel estimator is operable to generate said at least one transmit control signal using a single weight generator.

* * * * *